Figure 4:
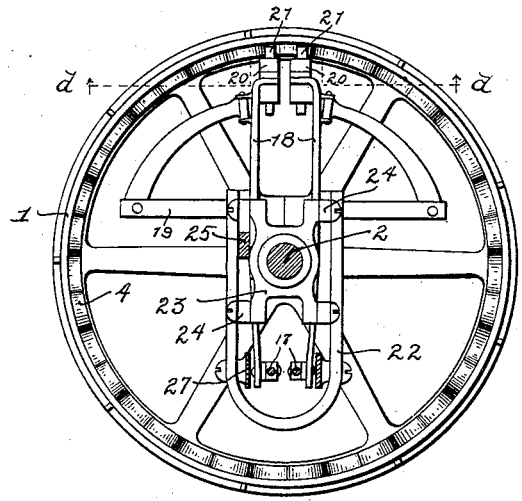

No. 699,277. Patented May 6, 1902.
A. T. ZETTERLUND.
HARVESTING MACHINE.
(Application filed Jan. 28, 1901.)
(No Model.) 3 Sheets—Sheet 1.
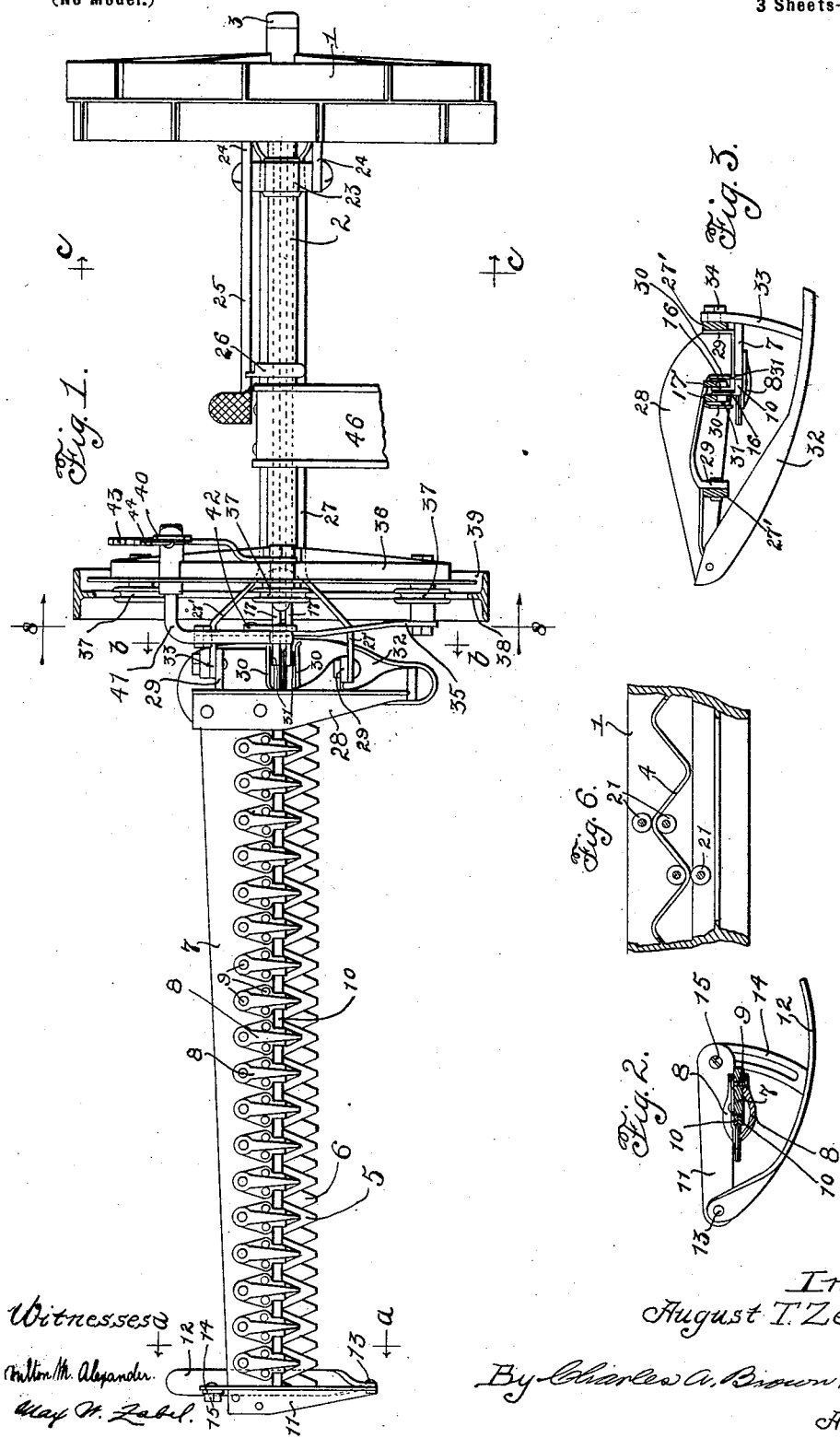
Witnesses
Milton M. Alexander
May W. Label
Inventor:
August T. Zetterlund,
By Charles A. Brown & Cragg
Attorneys.

No. 699,277. Patented May 6, 1902.
A. T. ZETTERLUND.
HARVESTING MACHINE.
(Application filed Jan. 28, 1901.)
(No Model.) 3 Sheets—Sheet 2.

Witnesses:
Milton M. Alexander
May W. Zabel

Inventor:
August T. Zetterlund
By Charles A. Brown & Cragg
Attorneys.

THE NORRIS PETERS CO., PHOTO-LITHO., WASHINGTON, D. C.

No. 699,277. Patented May 6, 1902.
A. T. ZETTERLUND.
HARVESTING MACHINE.
(Application filed Jan. 28, 1901.)

(No Model.) 3 Sheets—Sheet 3.

Witnesses:
Harvey L. Hanson
Max N. Lubl.

Inventor:
August T. Zetterlund,
By Charles A. Brown & Cragg
Attorneys.

UNITED STATES PATENT OFFICE.

AUGUST TH. ZETTERLUND, OF CHICAGO, ILLINOIS, ASSIGNOR OF ONE-THIRD TO MILTON L. THACKABERRY, OF CHICAGO, ILLINOIS.

HARVESTING-MACHINE.

SPECIFICATION forming part of Letters Patent No. 699,277, dated May 6, 1902.

Application filed January 28, 1901. Serial No. 45,034. (No model.)

*To all whom it may concern:*

Be it known that I, AUGUST TH. ZETTERLUND, a citizen of the United States, residing at Chicago, in the county of Cook and State of Illinois, have invented a certain new and useful Improvement in Harvesting-Machines, (Case No. 1,) of which the following is a full, clear, concise, and exact description, reference being had to the accompanying drawings, forming part of this specification.

My invention relates to harvesting machinery, and more particularly to those harvesting-machines employed in the reaping and mowing of grasses or like products.

My invention has for its object the provision of an improved machine of this class by which the grass to be mowed is brought in contact with two transversely-movable knife blades or shares. In this manner each blade of grass in the path of the machine is severed, whereas if one movable and one stationary cutting-blade are employed some of the grass in the path of the machine is bent over instead of being cut.

My invention has for its further object the provision of actuating mechanism associated with cutting-blades for transferring motion thereto from the rotating portions of the machine—as, for instance, from one of the wheels thereof. By means of my invention I am enabled to construct the machine in such manner that the cutting-blades thereof are actuated in an exceedingly rapid manner even when the machine is moved slowly.

My invention is particularly applicable in mowing fields which are covered with thick and heavy growths of grass or the like due to the rapid actuation of the oppositely-moving cutting-blades in the machine.

A further feature of my invention consists in the simple and efficient means employed to impart rapid motion to the cutting-blades, the arrangement being such that the loss due to friction in the moving parts is reduced to a small quantity.

In accordance with my invention I provide two oppositely-moving sets of knives or cutting-blades, which are adapted to shear or sever the grass when suitably actuated, each piece of grass being brought into contact with the two transversely-movable cutting edges. In the preferred embodiment of my invention I utilize one of the wheels of the machine to supply the motive power for actuating the knife-blades by providing thereon a wave-shaped cam, which may be constructed in the form of a sine curve. I provide two sets of cam-rollers in contact with said wave-shaped cam, associated, respectively, with the knife-blades through suitable lever mechanism. The two sets of rollers are placed in contact with the wave-shaped cam in such a way that a relatively opposite reciprocation thereof is effected. In this manner I secure a relatively opposite reciprocation of the two sets of knife-blades, which knife-blades are preferably vertically disposed with respect to each other.

I provide means in connection with my invention for controlling the engagement of the cam-rollers with the actuating-cam, so that the machine may be transported without actuating the knife-blades. I provide further means in connection with my invention for controlling the height above the ground at which the grass is to be severed.

Further features of my invention will be set forth hereinafter.

I will explain my invention in detail by reference to the accompanying drawings, illustrating the preferred embodiment thereof, in which—

Figure 7:
Figure 5:
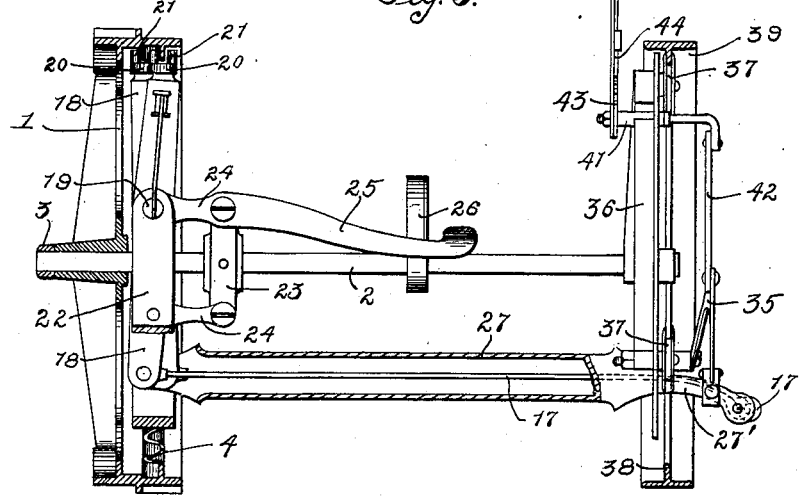
Figure 8:
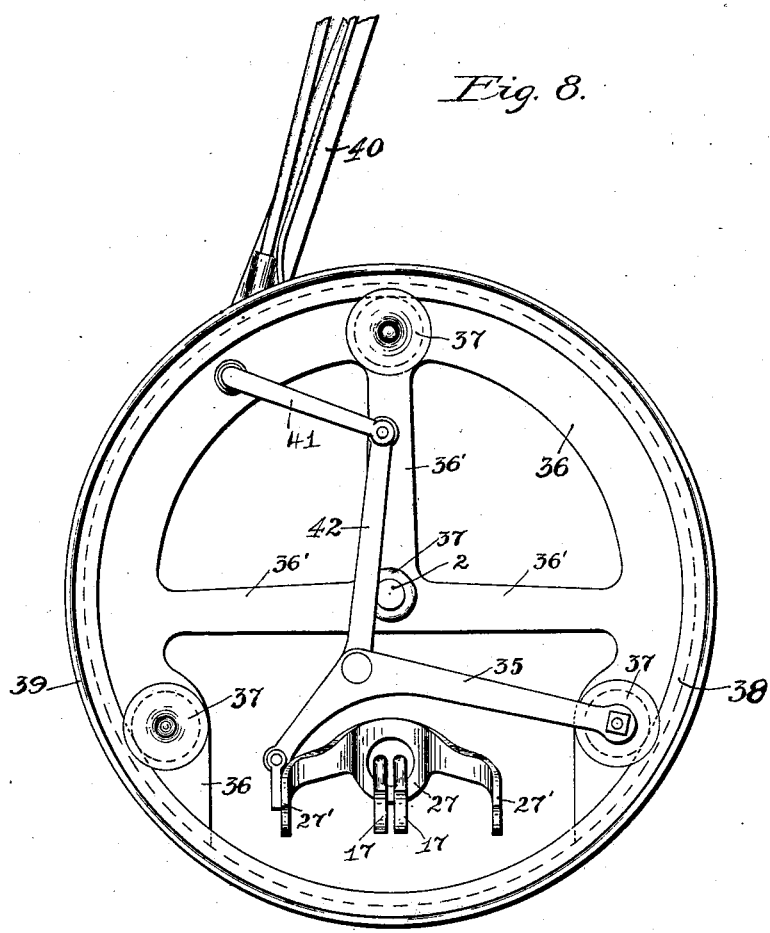

Figure 1 is a top view, partially in section, of a machine constructed in accordance with my invention. Fig. 2 is a sectional view on line $a\ a$ of Fig. 1. Fig. 3 is a sectional view on line $b\ b$ of Fig. 1. Fig. 4 is a sectional view on line $c\ c$ of Fig. 1. Fig. 5 is a rear view, partly in section, of my improved machine, the cutting portions thereof being removed. Fig. 6 is a partial sectional view on line $d\ d$ of Fig. 4. Fig. 7 is a detail view of the adjustable support for the knife-blade supports. Fig. 8 is a detail view showing features of construction along line 8 8 of Fig. 1.

Like characters of reference indicate like parts throughout the different views.

The machine of my invention is provided with a traction-wheel 1, loosely mounted upon a shaft 2. A nut 3 is located upon said shaft to act as a collar for the hub of the said wheel 1. The wheel 1 is provided with a wave-shaped cam 4 upon its interior periphery, which cam is adapted to cause an actuation of the two sets of relatively oppositely reciprocating knife-blades 5 6. The two sets of knife-blades preferably consist of a plurality of double-edged knives integrally united to a back-piece, the angles of the cutting edges of said knives being preferably arranged at an angle of sixty degrees to the back-piece. The two sets of knife-blades 5 and 6 are mounted preferably one above the other adjacent to the forward edge of a supporting-plate 7. The knife-blades 5 and 6 are held in place by means of clasps 8 8, arranged upon both sides of the supporting-bar 7 and held in place thereon preferably by means of rivets 9 9. The clasps 8 8 engage suitable projecting portions or back-pieces 10 10, provided upon the rear end of each set of knife-blades, by means of which projections said knife-blades are held in place alongside the supporting-bar 7, but are not prevented thereby in a movement transverse to the said machine. The supporting-bar 7 is secured at one end to a cross-bar 11, which cross-bar supports a sliding shoe 12, rotatably secured at one end thereof by means of a pin 13 and adjustably secured to the other end through the agency of the slotted arm 14 and the set-screw 15. An adjustment of the shoe 12 effects a raising or lowering of the outer portion of the supporting-bar 7, thereby bringing the knife-edges farther away from or closer to the ground. The inner end of each set of knife-blades is provided with a vertically-projecting arm 16, which are each pivotally secured to a connecting-bar 17. The connecting-bars 17 are in turn each pivotally secured to a lever 18, rotatably mounted upon a shaft 19. Each lever 18 is provided at its upper extremity with a rotatably-mounted disk 20, each of which disks is provided with a pair of rollers 21 21. The two rollers 21 21 of each set are adapted to engage the cam 4 upon opposing surfaces thereof, so that a forward-and-backward movement of the lever 18 is effected by means of said cam and said rollers. The rollers are placed along the cam 4 preferably in such a position that when one lever 18 has reached its limit in its forward movement the other contact-lever has reached the limit of its movement in the opposite direction. In this manner an opposite reciprocation of the levers 18 is effected. This opposite reciprocation of the levers 18 is transferred to the connecting-rods 17 and by them to the two sets of movable knife-blades. An opposite movement of the two sets of knife-blades is thus effected, and grass or other products in the path of the moving machine are severed by coming in contact with the two oppositely-movable cutting edges. The rapidity of movement of the knife-blades is dependent upon the pitch of the wave-shaped cam. It will thus be readily apparent how a rotation of the wheel 1 causes a rapid actuation of the two sets of knife-blades 5 and 6.

The shaft 19 is fixedly secured to a U-shaped bar 22. The U-shaped bar 22 is movably secured to a hub 23, fixedly secured to the shaft 2 by means of four links 24 24. One of the links 24 is provided with an extension 25, which may be secured in place along the shaft by means of a detent or catch 26. It will be seen that a vertical movement of the U-shaped bar 22, together with the shaft 19, may take place substantially in a plane parallel to the hub portion 23 when the arm 25 is moved up or down. In the normal position the arm 25 is lowered and retained in place by the catch 26, in which position the rollers 21 21 engage the surfaces of the wave-shaped cam 4. When the arm 25 is brought out of engagement with the catch 26 and is raised, the rollers 21 are released from the cam 4, and a rotation of wheel 1 will not actuate the knife-blades 5 and 6.

A tube 27, preferably split at both ends, is fastened at one extremity to the U-shaped bar 22 and incloses the connecting-rods 17. The other end of the tube 27 is pivotally secured by its two projecting arms 27' 27' to the supporting-bar 7 by means of a cross-bar 28, provided for this purpose with ears or projections 29 29. Guides 30 30 are also provided upon the cross-piece 28 to prevent disengagement between the connecting-rods 17 17 and the vertical projections 16 16, provided upon each set of knife-blades 5 and 6. The connecting-rods engage pins 31 31, fastened to the said vertical projections 16 16. A sliding shoe 32 is pivotally secured at one end to the cross-bar 28 and is adjustably connected to the opposite end by means of a slotted arm 33 and a set-screw 34.

A lever 35 is rotatably secured to a framework 36. The said framework has mounted thereon three rotatably-mounted wheels 37 37 37, placed about one hundred and twenty degrees apart, which wheels are provided with grooves and are adapted to engage a web 38 of a wheel 39, whose cross-section is preferably T-shaped. The frame 36 is preferably fixedly secured to the shaft 2. A rotation of wheel 39 is, however, permitted, due to the mounting of said wheel about the three small wheels 37 37 37. The lever 35 is secured at its other extremity to projecting arm 27' of the tube 27. It will be seen that the upward or downward movement of the lever will effect an upward or downward movement of the supporting-bar 7, thus controlling the height above the ground at which the grasses are to be cut, and to accomplish this result I employ a hand-controlled lever 40, secured to a rock-shaft 41. The lever 35 is pivotally secured to one of the arms 27' of the tube 27, which arms 27' are pivotally secured to projections provided upon the cross-bar 28, as hereinbefore stated. The shaft 41 is mounted in a fixed bearing provided upon the frame 36 and is secured by means of the connecting-bar 42 to a pivotal point upon the lever 35. An angular displacement of the hand-controlled lever 40 rotates the rock-shaft 41, which rock-shaft by means of its projecting arm raises one end of the lever 35, whereby the supporting-bar 7 and the tube 27 are raised or lowered, as desired, to control the height from the ground at which the knife-blades are adapted to sever the material. The frame 36, upon which the wheels 37 37 37 are mounted, is preferably constructed in the form of an arc of a circle, with spokes 36' passing through a hub 37', which is secured to the shaft 2. The frame 36 is provided with a bearing to support the rock-shaft 41 and is also provided with means for pivotally supporting one end of the lever 35, which lever is connected to a projecting arm of the rock-shaft 41 by means of the connecting-bar 42. A guide-bar 43, provided with notches, is mounted alongside of the lever-arm 40, and the lever is secured in place by means of the said bar. A pawl 44, controlled by the handle 45, serves to engage the notches along the periphery in said guide-bar. A forwardly-extending supporting member 46 is fixedly secured to the shaft 2. This member may support the seat and the tongue of the machine, which have been omitted in the drawings for the sake of clearness.

While I have herein shown and particularly described the preferred embodiment of my invention, I do not wish to limit myself to the precise construction and arrangement as herein shown and particularly described; but,

Having thus described my invention, I claim as new and desire to secure by Letters Patent—

1. In a harvesting-machine, the combination with a traction-wheel, of a shaft about which said traction-wheel is rotatably mounted, a framework also mounted upon said shaft, a second wheel rotatably mounted about said framework, two rows of knife-blades moving relatively in opposite directions, a wave-shaped cam mounted upon the interior periphery of said traction-wheel, means interposed between the said wave-shaped cam and the said two rows of knife-blades for causing an actuation thereof in opposite directions, said means passing transversely through said framework, and lever mechanism for disengaging said means from the said wave-shaped cam, substantially as described.

2. In a harvesting-machine, the combination with a traction-wheel, of a shaft about which said traction-wheel is rotatably mounted, a framework also mounted upon said shaft, a second wheel rotatably mounted about said framework, two rows of knife-blades moving relatively in opposite directions, a wave-shaped cam mounted upon the interior periphery of said traction-wheel, means interposed between the said wave-shaped cam and the said two rows of knife-blades for causing an actuation thereof in opposite directions, said means passing transversely through said framework, lever mechanism for disengaging said means from the said wave-shaped cam, a framework for supporting the said two rows of knife-blades, and means mounted upon said knife-supporting framework for adjusting the height thereof from the ground, substantially as described.

3. In a harvesting-machine, the combination with a traction-wheel, of a shaft about which said traction-wheel is rotatably mounted, a framework also mounted upon said shaft, a second wheel rotatably mounted about said framework, two rows of knife-blades moving relatively in opposite directions, a wave-shaped cam mounted upon the interior periphery of said traction-wheel, means interposed between the said wave-shaped cam and the said two rows of knife-blades for causing an actuation thereof in opposite directions, said means comprising levers and connecting-rods passing through said framework, lever mechanism for disengaging said means from the said wave-shaped cam, a framework for supporting said two rows of knife-blades, and means mounted upon said knife-supporting framework for adjusting the height thereof from the ground, substantially as described.

In witness whereof I hereunto subscribe my name this 12th day of January, A. D. 1901.

AUGUST TH. ZETTERLUND.

Witnesses:
J. J. HOGELGREN,
H. J. W. GEYER.